United States Patent

Esclamadon

[15] 3,673,260

[45] June 27, 1972

[54] HALOGENATED THIOETHERS AND METHOD OF PREPARATIONS

[72] Inventor: Christian Esclamadon, Les Chenes, France

[73] Assignee: Societe Anonyme dite: Societe Nationale des Petroles D'Aquitaine Courbevoie

[22] Filed: May 20, 1969

[21] Appl. No.: 826,291

[30] Foreign Application Priority Data

May 21, 1968 France..................................68152543
May 21, 1968 France..................................68152544

[52] U.S. Cl...................260/609 A, 106/287 SC, 260/47 EP, 260/79 R, 260/348.6, 260/348 R, 260/481 R, 260/593 H, 260/609 E, 260/609 F, 424/337
[51] Int. Cl..................................C07c 149/00, C07c 149/18
[58] Field of Search..............................260/609 A

[56] References Cited

OTHER PUBLICATIONS

Truce et al. " J. Org. Chem." Vol. 33 (1968) pp. 43–47

Primary Examiner—Joseph Rebold
Assistant Examiner—Delbert R. Phillips
Attorney—Ostrolenk, Faber, Gerb & Soffen

[57] ABSTRACT

New halogenated thioether compounds of the general formula $$R(S-CH_2-CHY-CH_2X)_n$$

in which X represents a halogen atom, Y represents a hydrogen atom or a hydroxyl group, R is a mono or divalent cyclic or acyclic unsaturated hydrocarbon residue having up to 20 carbon atoms and $n$ is 1 or 2 according to whether R is mono or divalent, are prepared by reacting thietane (thiacyclobutane or trimethylene sulphide) or 3-hydroxy thietane with a double-bonded halogen-substituted hydrocarbon derivative. By means of treatment with an aqueous solution of a base, the new thioether compounds in which Y is hydroxyl may be used to prepare corresponding new 2,3-epoxy-thiopropyl and bis(2,3-epoxy-thiopropyl) compounds.

21 Claims, No Drawings

HALOGENATED THIOETHERS AND METHOD OF PREPARATIONS

The present invention relates to a new process for the preparation of halogenated thioethers, which may be hydroxylated; it relates particularly to the synthesis of these compounds starting from halogen derivatives and thietane or 3-hydroxy-thietane, which are readily available starting materials. The compound referred to as "thietane" is thiacyclobutane (trimethylene sulphide).

The invention also relates to certain new thioethers.

The products prepared by the process of the present invention can be represented by the general formula:

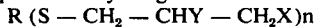

in which X represents a halogen atom, preferably chlorine or bromine, Y a hydrogen atom or a hydroxyl group, R is a mono or divalent hydrocarbon residue which may be unsaturated and cyclic or not and which may include an ester function or ketone function and be substituted with a halogen, and $n$ is an integer equal to 1 or 2 according to whether R is mono or divalent.

These compounds are of importance industrially in different fields. On account of the presence in the same molecule of heteroatoms such as sulphur, halogen and possibly oxygen, and one or more double bonds, they are particularly reactive.

They are used in the preparation of insecticides or pesticides. They can also be used in the composition of plasticizers for sulphur. Moreover, those thioethers prepared by the process of the invention which have a halogen in the alpha-position relative to a hydroxyl group can readily be transformed by dehydrohalogenation into epoxy derivatives of sulphur corresponding to the formula:

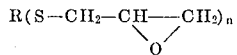

These epoxy derivatives enable epoxy resins to be obtained by the addition of, for example, polyamines or carboxylic polyacids; they can also be used as modifiers for commercially available epoxy resins.

The process according to the invention consists in reacting a mono or dihalogenated hydrocarbon derivative in which the carbon atom which is in the alpha-position relative to that to which the halogen is attached carries a double bond, with thietane or 3-hydroxy-thietane.

The reaction according to the invention can be represented by

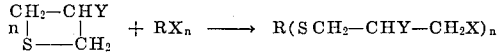

R, Y and $n$ having the meanings given above.

In the course of this reaction, there is cleavage of the heterocyclic sulphur ring at the position of the sulphur atom, attachment of the R-group of the halogenated derivative to the sulphur atom and attachment of the halogen to the hydrocarbon residue of the cleaved heterocyclic sulphur ring.

When dihalogenated derivatives are used, a mixture of mono-addition and di-addition compounds is formed, these being respectively R—S—CH$_2$—CHY—CH$_2$X and XH$_2$C—CHY—CH$_2$—S—R—S—CH$_2$—CHY—CH$_2$X The halogenated hydrocarbon derivatives which have a double bond on the carbon which is the alpha-position relative to that which carries the halogen, and which are used for preference in the process according to the invention, can be represented by the following general formula:

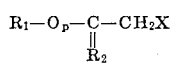

in which X represents a halogen atom, preferably chlorine or bromine, R$_1$ represents a hydrogen atom or a hydrocarbon radical which may be substituted or unsubstituted and have up to 12 carbon atoms, $p$ is zero or 1 and R$_2$ represents oxygen or a divalent hydrocarbon radical having up to 12 carbon atoms, it being possible for this radical and R$_1$ to be joined and to form with the carbon atom to which they are attached, an unsaturated cyclic hydrocarbon ring, the said radical R$_2$ or the said ring possibly also being substituted by a CH$_2$X group attached to a carbon which carries a double bond.

The radical R$_1$ may be a substituted or unsubstituted alkyl radical such as methyl, ethyl, propyl, hexyl or octyl, a substituted or unsubstituted aryl radical such as phenyl, toluyl or trimethylphenyl, or a cycloalkyl radical such as cyclopentyl, cyclohexyl or cyclooctyl.

The divalent hydrocarbon radical R$_2$ can be saturated or unsaturated and may have a halomethyl substituent. In particular, it can represent a substituted or unsubstituted alkylidine radical such as ethylidene, propylidene, pentylidene, hexylidene, benzylidene or 2-halo-ethylidene, for example.

The radicals R$_1$ and R$_2$ can form with the carbons to which they are attached, various unsaturated cyclic groups and, in particular, hydrocarbon cyclic groups having an aromatic nucleus, which cyclic groups can include a halo-methyl substituent.

By way of example, reference may be made to allyl chloride or bromide, 2-methyl-3-chloro or 2-methyl-3-bromo-propene, trans-1,4-dichloro or dibromo-2-butene, benzyl chloride, 1,4-dichloromethyl-benzene and methyl, ethyl, propyl, n-hexyl or phenyl chloro or bromo-acetate.

In order to carry out the reaction, a mixture of the halogen derivative and the thietane or hydroxy-thietane is heated. The temperature of the reaction depends on the halogen derivative which is used but it is generally between 50° and 120° C. In the case in which 3-hydroxy-thietane is reacted with a halogen derivative of the formula

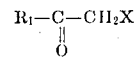

in which R$^1$ represents a hydrocarbon radical as previously defined, the reaction temperature will always be less than 100° C. The reactants can be used in stoichiometric proportions but it is preferable to use one or other in slight excess, and in particular, to use an excess of the more volatile reactant.

Generally speaking, the reaction takes place without a catalyst but the use of a small quantity of a tertiary aliphatic amine allows the speed of the reaction to be increased.

Among other factors, the duration of the reaction depends on the nature of the halogen derivative used and on the presence or absence of a catalyst. Generally the reaction proceeds for 12 to 24 hours in the absence of a catalyst and 12 to 20 hours in the presence of a catalyst.

When the reaction has been completed, the reactants which have not reacted are separated and the thioethers according to the invention are collected.

The halogenated and hydroxylated thioethers which can be obtained by the process according to the invention readily yield the corresponding epoxy derivatives by treatment with an aqueous solution of sodium or potassium hydroxide according to the reaction:

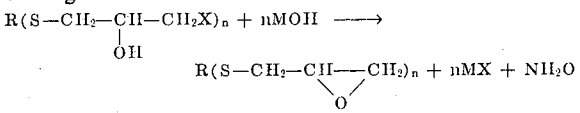

The group

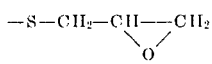

can be readily identified by infra-red spectrography, by means of the absorption bands at the following frequencies:
3,060 cm$^{-1}$, 1,480–1,475 cm$^{-1}$,
1,260 cm$^{-1}$, 920 cm$^{-1}$, 840 cm$^{-1}$ The following non-limitative examples illustrate the invention.

EXAMPLE 1

Into a 500 cc. reaction vessel there is introduced 153 g. (2 moles) of allyl chloride and 90 g. (1 mole) of 3-hydroxy-thietane; the mixture is stirred while maintaining the temperature at 50° C for 24 hours.

When the reaction has been completed, the reaction medium is distilled; the distillation can be commenced at atmospheric pressure in order to eliminate the excess allyl chloride and terminated under reduced pressure; in this way 116.5 g of allyl 3-chloro-2-hydroxy-propyl sulphide

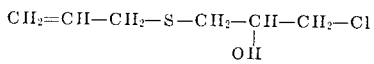

is obtained with a yield of 70 percent relative to the thietanol. This is a new chemical product boiling at 88° C under 0.2 mm Hg.

The characteristics of this product are as follows:
Refractive index $n_D^{20} = 1.5230$
Its elementary analysis is:

|  | C % | H % | S % | Cl % |
|---|---|---|---|---|
| Found | 43.53 | 6.72 | 18.64 | 21.36 |
| Calculated | 43.28 | 6.61 | 19.2 | 21.37 |

Dehydrochlorination of the chlorhydrin obtained 150 g. of allyl 3-chloro-2-hydroxy-propyl sulphide are dissolved in 250 cc. of ether; this solution is treated with 250 g. of 40 percent sodium hydroxide solution for 45 minutes and the mixture is filtered and separated; the aqueous phase is extracted with ether. Allyl 2,3-epoxy-propyl sulphide or allyl glycidyl sulphide

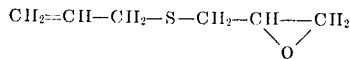

is obtained with a yield of 43 percent relative to the 3-hydroxy thietane.

The characteristics of this product are: Boiling point 65° C under 5 mm of mercury.
$n_D^{20} = 1.5001$

EXAMPLE 2

In the reaction vessel as previously there are mixed by means of an agitator, 92 g. (1 mole) of 2-methyl-3-chloro-propene and 90 g. (1 mole) of 3-hydroxy-thietane; the mixture is heated for 24 hours at a temperature of 70° C while continuing the agitation. The sulphuretted chlorohydrin is distilled and obtained with a yield of 60 percent.

The formula of this new compound is:

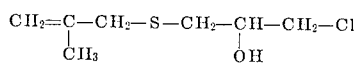

and its characteristics are as follows:
Boiling point 92° C under 0.25 mm of mercury
$n_D^{20°}C = 1.5141$
Its elementary analysis is

|  | C % | H % | S % | Cl % |
|---|---|---|---|---|
| found | 47.29 | 7.85 | 20.17 | 17.09 |
| calculated | 47.22 | 7.75 | 20.17 | 17.21 |

Preparation of the epoxy derivative

By dehydrochlorination of the halohydrin obtained and under the same conditions as previously the corresponding epoxy derivative

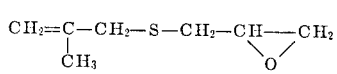

is obtained with a yield of 40 percent.
This is a new product whose boiling point is:
53° C under 0.15 mm Hg.
Its elementary analysis is:

|  | C % | H % | S % |
|---|---|---|---|
| found | 58.4 | 8.56 | 21.37 |
| calculated | 58.33 | 8.33 | 22.2 |

EXAMPLE 3

A mixture of 150 g. (1.2 mole) of benzyl chloride and 90 g. (1 mole) of 3-hydroxy-thietane is heated for 20 hours at a temperature of 100° C while stirring. The reaction product is distilled under reduced pressure.

115 g. of sulphuretted chlorhydrin

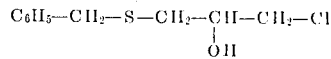

is obtained with a yield of 53 percent relative to the thietanol.
The physical constants are:
$n_D^{20} = 1.5790$
Boiling point 135° C under 0.05 mm Hg.
Dehydrochlorination of the sulphuretted chlorhydrin An ether solution of the chlorhydrin obtained is treated with a 40 percent aqueous solution of sodium hydroxide; the product obtained is filtered and separated; the solvent in the organic phase is distilled and benzyl 2,3-epoxy-propyl sulphide

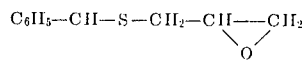

is obtained with a yield of 42 percent.
The characteristics of this new product are as follows:
Boiling point 100° C under 0.5 mm of mercury
$n_D^{20°}C = 1.5660$ The same compound can be prepared under the same conditions starting from benzyl bromide.

The analysis of this epoxy sulphur compound is as follows:

|  | C % | H % | S % |
|---|---|---|---|
| found | 66.24 | 6.95 | 17.69 |
| calculated | 66.65 | 6.66 | 17.79 |

EXAMPLE 4

In a 500 cc. reaction vessel, 136 g. (1.1 mole) of ethyl chloroacetate and 50 g. (1.58 mole) of 3-hydroxy-thietane are mixed. The mixture is heated for 24 hours at 80° C while stirring; the unreacted substances are distilled and 79 g. (that is to say 62 percent) of the corresponding chlorhydrin are obtained:
ethyl 6-chloro-5-hydroxy-3-thia hexanoate

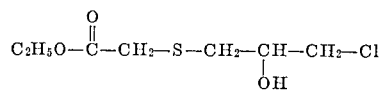

This compound, which has not previously been described, has the following characteristics:
Boiling point 140° C under 0.4 mm of mercury
$n_D^{20°}C = 1.5022$
Its elementary analysis is:

|  | C % | H % | S % | Cl % |
|---|---|---|---|---|
| found | 39.15 | 5.70 | 17.50 | 14.35 |
| calculated | 39.45 | 6.12 | 16.70 | 15.03 |

EXAMPLE 5

A mixture of 125 g. (1 mole) of trans-1,4-dichloro-2-butene and 220 g. (3 moles) of 3-hydroxy-thietane are heated for 12 hours at a temperature of 80° C. The mixture is stirred throughout the reaction. The excess 3-hydroxy-thietane is distilled under vacuum. The crude product contains a mixture of the sulphuretted dichlorhydrins of the formulas:

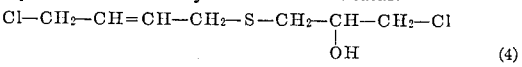  (4)

and

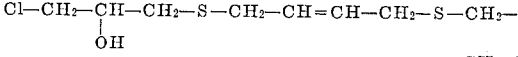

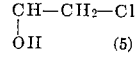  (5)

The chlorhydrin (4) is separated by distillation and 175 g of the sulphuretted dichlorhydrin (5) in solution in ether is treated with a 40 percent solution of sodium hydroxide for 45 minutes while stirring vigorously. The medium is filtered and separated; the organic solvent is distilled under vacuum; the residue is dried by means of anhydrous sodium sulphate. trans-1,4-bis-(2,3-epoxy-propylthio)-2-butene

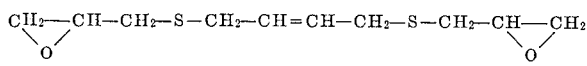

is obtained with a yield of 80 percent relative to the dichloro derivative used.

The characteristics of this crude non-distillable product are as follows:

|  | C % | H % | S % |
|---|---|---|---|
| found | 49.35 | 6.83 | 28.60 |
| calculated | 51.72 | 6.89 | 27.71 |

Its infra-red spectrum corresponds to the formula given.

EXAMPLE 6

A mixture of 250 g. (1.43 mole) of 1,4-dichloromethyl-benzene and 260 g. (2.9 moles) of 3-hydroxy-thietane is heated for 2 hours at 100° C. The corresponding di-sulphuretted dihalochlorhydrin is obtained

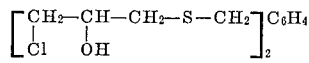

125 cc. of acetone is added directly to the reaction product and the mixture is treated with 30 g. of 40 percent sodium hydroxide solution. The mixture is stirred vigorously for 30 minutes, filtered and separated. After evaporation of the solvent 270 g. of the corresponding diepoxy disulphuretted derivative are obtained.

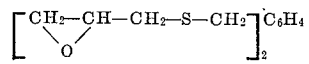

EXAMPLE 7

A mixture of 74 g. (1 mole) of thietane and 150 G. (2 moles) of allyl chloride is introduced into a 500 cc. autoclave and is heated with stirring at a temperature of 120° C under autogenous pressure for 24 hours.

The contents of the autoclave are then distilled and 100 g. of allyl 3-chloro-propyl sulphide $CH_2 = CH-CH_2-S(CH_2)_3Cl$ is obtained with a yield of 67 percent.

This is a new chemical product whose boiling temperature is 55° C under 0.3 mm Hg and its refractive index is $n_D^{20} = 1.4990$

EXAMPLE 8

A mixture of 91.5 g. (1 mole) of methallyl chloride and 74 g. (1 mole) of thietane is heated with stirring for 16 hours at a temperature of 70° C in the presence of a catalytic quantity of tributyl amine.

The reaction mixture is then distilled under reduced pressure; in this way 68 g. of methallyl 3-chloro-propyl sulphide

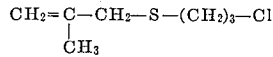

is obtained with a yield of 40 percent.

This is a new chemical product whose characteristics are as follows:

Boiling temperature 48° C under 0.05 mm Hg
Refractive index $n_D^{20} = 1.4972$
Its elementary analysis is:

|  | C % | H % | S % | Cl % |
|---|---|---|---|---|
| found | 51.22 | 7.65 | 18.11 | 21.50 |
| calculated | 51.06 | 7.90 | 19.46 | 21.58 |

EXAMPLE 9

A mixture of 125 g. (1 mole) of trans-1,4-dichloro-2-butene and 148 g. (2 moles) of thietane is kept for 24 hours at a temperature of 70° C with stirring.

Distillation of the reaction mixture enables a new dihalogenated thioether to be obtained, trans-1,8-dichloro-5-thia-2-octene $$Cl-CH_2-CH=CH-CH_2-S-(CH_2)_3-Cl$$

This product is characterized as follows:
Boiling temperature 105° C under 0.1 mm Hg
$n_D^{20} = 1.5251$
Elementary analysis

|  | C % | H % | S % | Cl % |
|---|---|---|---|---|
| found | 42.96 | 6.25 | 16.55 | 35.17 |
| calculated | 42.21 | 6.03 | 16.08 | 35.68 |

The distillation residue contains the diaddition derivative

EXAMPLE 10

A mixture of 126.5 g. (1 mole) of benzyl chloride and 74 g. (1 mole) of thietane is heated at a temperature of 70° C for 24 hours with continuous stirring.

When the reaction has been completed the reaction mixture is distilled; in this way, benzyl 3-chloro-propyl sulphide $C_6H_5-CH_2-S-(CH_2)_3-Cl$ is obtained with a yield of 50 percent.

EXAMPLE 11

A mixture of 92.5 g. (1 mole) of chloropropanone and 74 g. (1 mole) of thietane is kept for 24 hours at a temperature of 60° C. with stirring.

Distillation of this reaction mixture enables 1-chloro-4-thia-heptanone

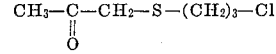

to be obtained with a yield of 67.5 percent.

This is a new product which possesses the following characteristics:
Boiling temperature 73° C under 0.03 mm Hg
$n_D^{20} = 1.5352$
Elementary analysis gives:

|  | C % | H % | S % | Cl % |
|---|---|---|---|---|
| found | 43.60 | 6.84 | 18.40 | 21.47 |
| calculated | 43.25 | 6.60 | 19.20 | 21.30 |

EXAMPLE 12

A mixture of 122 g. (1 mole) of ethyl chloroacetate and 74 g. (1 mole) of thietane is kept at a temperature of 80° C for 24 hours with stirring.

Distillation of the reaction mixture yields ethyl 1-chloro-4-thia-hexanoate

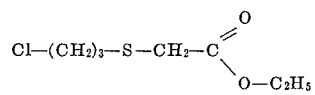

This product possess the following characteristics:
Boiling temperature = 105° C under 0.15 mm Hg
$n_D^{20} = 1.4832$
Elementary analysis gives:

|  | C % | H % | S % | Cl % |
|---|---|---|---|---|
| found | 42.61 | 6.74 | 15.50 | 17.85 |
| calculated | 42.75 | 6.61 | 16.28 | 18.07 |

I claim:

1. A process for the preparation of halogenated thioethers and hydroxylated halogenated thioethers which comprises reacting a thietane compound of the formula

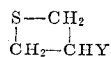

wherein Y is hydrogen or hydroxyl, with a halogenated hydrocarbon derivative of the formula

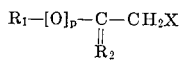

wherein X is halogen, $p$ is 0 or 1, $R_1$ is hydrogen or a hydrocarbon radical having up to 12 carbon atoms selected from the group consisting of alkyl, aryl or cycloalkyl radicals, and $R_2$ is an unsubstituted or halomethyl substituted alkylidine radical of up to 12 carbon atoms, and wherein $R_1$ and $R_2$ can, together with the carbon atom to which they are attached, form an unsubstituted or halomethyl substituted aromatic ring.

2. A process according to claim 1, wherein in said hydrocarbon derivative, $R_2$ is a halomethyl substituted alkylidine radical.

3. A process according to claim 1, wherein said hydrocarbon derivative is of the formula

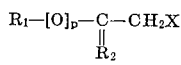

in which X represents a halogen atom, $p$ is zero or 1 and $R_1$ and $R_2$ are joined and, together with the carbon atom to which they are attached, form an unsubstituted or halomethyl substituted aromatic ring.

4. A process according to claim 3, wherein one of the carbon atoms of said ring carries a halomethyl substituent.

5. A process according to claim 1, wherein said halogen substituent is chlorine.

6. A process according to claim 1, wherein said halogen substituent is bromine.

7. A process according to claim 1, which is carried out at a reaction temperature between 50° and 120° C.

8. A process according to claim 1, wherein whichever of said thietane compound and said hydrocarbon derivative is the more volatile, is used in excess, relatively to the stoichiometric quantity.

9. A process according to claim 1, which proceeds for from 12 to 24 hours in the absence of a catalyst.

10. A process according to claim 1, wherein an aliphatic tertiary amine is used as a catalyst and said process proceeds for from 12 to 20 hours.

11. A halogenated thioether compound selected from the group consisting of

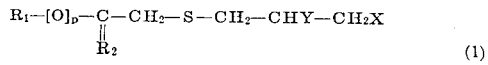

wherein X is halogen, $p$ is 0 or 1, $R_1$ is hydrogen or a hydrocarbon radical having up to 12 carbon atoms selected from the group consisting of alkyl, aryl or cycloalkyl radicals, $R_2$ is an unsubstituted or halomethyl substituted alkylidine radical of up to 12 carbon atoms, and wherein $R_1$ and $R_2$ can, together with the carbon atom to which they are attached, form a halomethyl substituted aromatic ring, Y is hydrogen or hydroxy

wherein X is halogen and R is $-CH_2-C_6H_5-CH_2-$ or $-CH_2-CH=CH-CH_2-$, Y is hydrogen or hydroxy and

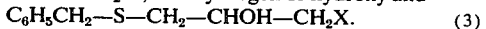

12. A compound according to claim 11 wherein X is chlorine.

13. A compound according to claim 11, wherein X is bromine.

14. A compound of the formula

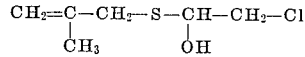

in accordance with claim 11.

15. A compound of the formula $C_6H_5-CH_2-S-CH_2-CHOH-CH_2Cl$ in accordance with claim 11.

16. Methallyl 3-chloro-propyl sulfide in accordance with claim 11.

17. 1,8-dichloro-5-thia-2-octene in accordance with claim 11.

18. A halogenated thioether according to claim 11 wherein Y is hydrogen.

19. A halogenated thioether compound according to claim 11 wherein Y is OH.

20. A process for the preparation of allyl 3-chloro-2-hydroxy-propyl sulphide, which comprises reacting allyl chloride and 3-hydroxy-thietane and recovering the sulphide product therefrom.

21. Allyl 3-chloro-2-hydroxy-propyl sulphide.

* * * * *

PO-1050
(5/69)

UNITED STATES PATENT OFFICE
CERTIFICATE OF CORRECTION

Patent No. 3,673,260              Dated June 27, 1972

Inventor(s) Christian Esclamadon

It is certified that error appears in the above-identified patent and that said Letters Patent are hereby corrected as shown below:

Column 4, line 67, for "formulas" read - - formulae - -.

Column 8, line 6, read - - (1) - - before the formula and delete "(1)" after the formula; line 18, read - - (2) - - before the formula and delete "(2)" after the formula; line 21, read - - (3) - - before the formula and delete "(3)" after the formula.

Signed and sealed this 26th day of December 1972.

(SEAL)
Attest:

EDWARD M. FLETCHER, JR.            ROBERT GOTTSCHALK
Attesting Officer                     Commissioner of Patents